United States Patent [19]

Chen

[11] Patent Number: 5,160,210
[45] Date of Patent: Nov. 3, 1992

[54] COUPLING FOR SECURING A HANDLEBAR TO A BICYCLE FRAME

[76] Inventor: Chen Y. Chi; No. 139-5, Anmei Rd., Meishan Tsun, Houli Hsiang, Taichung Hsien, Taiwan

[21] Appl. No.: 782,378

[22] Filed: Oct. 24, 1991

[51] Int. Cl.⁵ .............................. F16B 1/00
[52] U.S. Cl. ........................... 403/24; 403/51; 280/279
[58] Field of Search ............ 280/279, 280; 403/24, 403/50, 51

[56] References Cited

U.S. PATENT DOCUMENTS

| | | | |
|---|---|---|---|
| 3,490,343 | 1/1970 | Afanador et al. | 403/51 X |
| 4,573,698 | 3/1986 | Takahashi | 280/279 |
| 4,960,342 | 10/1990 | Chi | 403/24 |

FOREIGN PATENT DOCUMENTS 2629784 10/1989 France .................. 280/279

*Primary Examiner*—Andrew V. Kundrat
*Attorney, Agent, or Firm*—Poms, Smith, Lande & Rose

[57] ABSTRACT

A coupling including a sleeve having an annular rib formed on a lower peripheral portion, a bowl having an annular groove formed in an outer peripheral portion, a ball bearing disposed between the sleeve and the bowl, a gap formed between the bowl and the sleeve, and a gasket including an annular flange formed in an upper portion for engagement with the annular groove of the bowl and a member formed in a lower portion for engagement with the annular rib of the sleeve so as to cover and seal the annular gap formed between the sleeve and the bowl.

1 Claim, 1 Drawing Sheet

COUPLING FOR SECURING A HANDLEBAR TO A BICYCLE FRAME

BACKGROUND OF THE INVENTION

1. Field of the Invention

The present invention relates to a coupling, and more particularly to a coupling for securing a handlebar to a bicycle frame.

2. Description of the Prior Art

The closest prior art of which applicant is aware is his prior U.S. Pat. No. 4,960,342 to Chi, filed Mar. 15, 1990, entitled "COUPLING FOR SECURING A HANDLEBAR TO A BICYCLE FRAME". The coupling is located on the upper portion of the headset of the bicycle. Generally, a sealing ring is disposed between the frame fork 14 and the bowl 18.

The present invention has arisen to provide a coupling having a novel gasket provided therein.

SUMMARY OF THE INVENTION

The primary objective of the present invention is to provide a coupling having a novel gasket provided therein.

In accordance with one aspect of the invention, there is provided a coupling including a sleeve having an annular rib formed on a lower and outer peripheral portion, a bowl having an annular groove formed in a lower and outer peripheral portion, a ball bearing disposed between the sleeve and the bowl so that the sleeve is freely rotatable relative to the bowl, a gap formed between the bowl and the sleeve, and a gasket including an annular flange formed in an upper portion for engagement with the annular groove of the bowl and a member formed in a lower portion for engagement with the annular rib of the sleeve so as to cover and seal the annular gap formed between the sleeve and the bowl.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
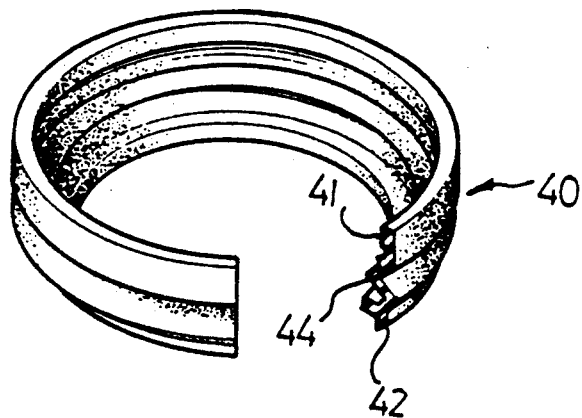
FIG. 1 is a perspective view of a gasket.
Figure 2:
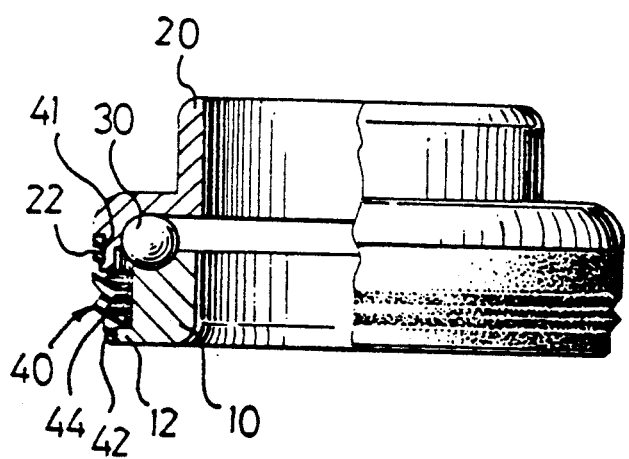
FIG. 2 is a partial cross sectional view of the coupling in accordance with the present invention.

Referring to the drawings, a coupling for securing handlebar to a bicycle frame in accordance with the present invention is generally disposed on the lower portion of the headset of the bicycle. The coupling comprises a sleeve 10 fixed relative to the frame fork of the bicycle, a bowl 20 fixed in the lower portion of the headset, and a plurality of balls 30 disposed between the sleeve 10 and the bowl 20 so that the sleeve 10 is free rotatable relative to the bowl 20. The sleeve 10 includes an annular rib 12 extended outward from the lower end thereof. The bowl 20 includes an annular groove 22 formed in the lower and outer peripheral portion thereof.

A gasket 40 has a substantially bellow type shape including an annular flange 41 formed in the inner and upper portion thereof for engagement with the annular groove 22 of the bowl 20, and an L-shaped member 42 formed on the lower portion thereof for engagement with the annular rib 12 of the sleeve 10 so that the annular gap formed between the sleeve 10 and the bowl 20 can be covered and sealed by the gasket 40. The gasket 40 is preferably made of rubber materials or the like enabling the upper portion and the lower portion of the gasket 40 to be engaged to the bowl 20 and the sleeve 10 respectively by the resilience of the gasket 40.

Accordingly, the coupling in accordance with the present invention has a novel gasket provided for covering and sealing the annular gap formed between the sleeve 10 and the bowl 20.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A coupling for securing a handlebar to a bicycle frame comprising a sleeve having an annular rib formed on a lower and outer peripheral portion thereof, a bowl having an annular groove formed in a lower and outer peripheral portion thereof, ball bearing means disposed between said sleeve and said bowl so that said sleeve is freely rotatable relative to said bowl, said bowl and said sleeve having an annular gap formed therebetween, and a gasket including an annular flange formed in an upper portion thereof for engagement with said annular groove of said bowl and an L-shaped member formed in a lower portion thereof for engagement with said annular rib of said sleeve so as to cover and seal said annular gap formed between said sleeve and said bowl, and including a middle portion substantially bellow-shaped so that said gasket maintains contact with said bowl and said sleeve when the width of said annular gap is varied.

* * * * *